United States Patent
Hua et al.

(10) Patent No.: US 11,320,921 B2
(45) Date of Patent: May 3, 2022

(54) TOUCH DISPLAY PANEL AND TOUCH DISPLAY DEVICE

(71) Applicant: Xiamen Tianma Micro-Electronics Co., Ltd., Xiamen (CN)

(72) Inventors: Huomei Hua, Xiamen (CN); Rong Chen, Xiamen (CN); Hongbo Zhou, Xiamen (CN); Guochang Lai, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 17/005,897

(22) Filed: Aug. 28, 2020

(65) Prior Publication Data
US 2021/0405795 A1 Dec. 30, 2021

(30) Foreign Application Priority Data
Jun. 30, 2020 (CN) .......................... 202010617559.4

(51) Int. Cl.
*G06F 3/041* (2006.01)
*G06F 3/044* (2006.01)

(52) U.S. Cl.
CPC .......... *G06F 3/0412* (2013.01); *G06F 3/0446* (2019.05)

(58) Field of Classification Search
CPC ................. G06F 3/0412; G06F 3/0446; G06F 2203/04103
See application file for complete search history.

(56) References Cited

U.S. PATENT DOCUMENTS

| 2016/0293122 | A1* | 10/2016 | Wang | G06F 3/0412 |
| 2017/0153746 | A1* | 6/2017 | Ahn | G06F 3/04166 |
| 2017/0255299 | A1* | 9/2017 | Shimoshikiryoh | G06F 3/0443 |
| 2021/0216164 | A1* | 7/2021 | Bao | G06F 3/0446 |

FOREIGN PATENT DOCUMENTS

| CN | 206497442 U | * | 9/2017 |
| CN | 206497442 U | | 9/2017 |
| CN | 108920013 A | | 11/2018 |
| CN | 108957824 A | | 12/2018 |

* cited by examiner

*Primary Examiner* — Liliana Cerullo
(74) *Attorney, Agent, or Firm* — Anova Law Group, PLLC

(57) ABSTRACT

A touch display panel and a touch display device are provided. The touch electrode rows of the display panel include first touch electrode rows and second touch electrode rows. A number of touch signal lines connected to each touch electrode of the first touch electrode rows is greater than a number of touch signal lines connected to each touch electrode of the second touch electrode rows. The first touch electrode rows include an A-th touch electrode row; and the second touch electrode rows includes a B-th touch electrode row and a C-th touch electrode row adjacent to the B-th touch electrode row. An area of a touch electrode in the B-th touch electrode row is smaller than an area of a touch electrode in the A-th touch electrode row, and smaller than an area of a touch electrode in the C-th touch electrode row.

20 Claims, 12 Drawing Sheets

TOUCH DISPLAY PANEL AND TOUCH DISPLAY DEVICE

CROSS-REFERENCES TO RELATED APPLICATIONS

This application claims priority of Chinese Patent Application No. 202010617559.4, filed on Jun. 30, 2020, the entire contents of which are hereby incorporated by reference.

FIELD OF THE DISCLOSURE

The present disclosure generally relates to the field of display technology and, more particularly, relates to a touch display panel and a touch display device.

BACKGROUND

The touch display panel is a display device with both display and command input functions. A user can directly touch the touch display panel with his hand or an object, and the touch display panel can detect the touched point and respond accordingly according to the area touched by the user. Touch display panels are used in personal mobile communication devices and integrated information terminals, such as tablet computers and smart phones, super notebook computers, and other major human-computer interaction interfaces. The touch display panel includes an external touch display panel and an in-cell touch display panel. The in-cell touch display panel is favored because of its lightness and thinness. With the development of the display technology, the requirements for touch display panels in display devices are becoming higher and higher.

The touch display panels provided in the prior art generally have a touch sensing function and can recognize touch position information. A common touch display panel is often provided with electrodes arranged in a matrix. The electrodes are used as touch electrodes during the touch stage and provide a constant signal and are used as the common electrodes during the display stage. However, when the touch display panel performs the display function, because the pixel voltage may disturb the common electrodes during the charging process. After the disturbance, a constant signal is input through the touch signal lines to restore to the target voltage. However, the differences in the lengths and the impedances of the touch signal lines result in an inconsistent ability to restore to the target voltage. Thus, it may be easy to have a split-screen phenomenon. The split-screen phenomenon reduces the display quality of the display panel, and the user experience is reduced.

Therefore, there is a need to provide a touch display panel and a touch display device that can reduce the split-screen display phenomenon, help improve the display quality, and enhance the user experience. The disclosed touch display panel and touch display device are directed to solve one or more problems set forth above and other problems in the art.

BRIEF SUMMARY OF THE DISCLOSURE

One aspect of the present disclosure provides a touch display panel. The touch display panel includes a display area; and a non-display area surrounding the display area. The non-display area includes a bonding area. Along a first direction, the bonding area is located on a side of the non-display area adjacent to the display area. The bonding area includes a plurality of signal input terminals. The display area includes a plurality of touch electrodes arranged as an array; each touch electrode of the plurality of touch electrodes is electrically connected to a signal input terminal of the plurality of signal input terminals through at least one touch signal line; a number of the plurality of touch electrodes arranged along a second direction that intersects the first direction form a touch electrode row; and a plurality of touch electrode rows are sequentially arranged along the first direction. The plurality of touch electrode rows include at least a plurality of first touch electrode rows and a plurality of second touch electrode rows. Along the first direction, the plurality of first touch electrode rows are located at a side of the plurality of second touch electrode rows away from the bonding area; a plurality of touch signal lines connected to each touch electrode of the plurality of first touch electrode rows is greater than a plurality of touch signal lines connected to each touch electrode of the plurality of second touch electrode rows; the plurality of first touch electrode rows includes at least one A-th touch electrode row adjacent to the plurality of second touch electrode rows; the plurality of second touch electrode rows includes at least one B-th touch electrode row adjacent to the plurality of first touch electrode rows; the plurality of second touch electrode rows further include at least one C-th touch electrode row adjacent to the B-th touch electrode row; and A, B, and C are adjacent positive integers. An area of a touch electrode in the at least one B-th touch electrode row is smaller than an area of a touch electrode in the at least one A-th touch electrode row; and the area of the touch electrode in the at least one B-th touch electrode row is smaller than an area of a touch electrode in the at least one C-th touch electrode row.

Another aspect of the present disclosure provides a touch display device. The touch display device includes a touch display panel. The touch display panel includes a display area; and a non-display area surrounding the display area. The non-display area includes a bonding area. Along a first direction, the bonding area is located on a side of the non-display area adjacent to the display area. The bonding area includes a plurality of signal input terminals. The display area includes a plurality of touch electrodes arranged as an array; each touch electrode of the plurality of touch electrodes is electrically connected to a signal input terminal of the plurality of signal input terminals through at least one touch signal line; a number of the plurality of touch electrodes arranged along a second direction that intersects the first direction form a touch electrode row; and a plurality of touch electrode rows are sequentially arranged along the first direction. The plurality of touch electrode rows include at least a plurality of first touch electrode rows and a plurality of second touch electrode rows. Along the first direction, the plurality of first touch electrode rows are located at a side of the plurality of second touch electrode rows away from the bonding area; a plurality of touch signal lines connected to each touch electrode of the plurality of first touch electrode rows is greater than a plurality of touch signal lines connected to each touch electrode of the plurality of second touch electrode rows; the plurality of first touch electrode rows includes at least one A-th touch electrode row adjacent to the plurality of second touch electrode rows; the plurality of second touch electrode rows includes at least one B-th touch electrode row adjacent to the plurality of first touch electrode rows; the plurality of second touch electrode rows further include at least one C-th touch electrode row adjacent to the B-th touch electrode row; and A, B, and C are adjacent positive integers. An area of a touch electrode in the at least one B-th touch electrode row is smaller than an area of a touch electrode in the at least one A-th touch electrode row; and the area of the touch electrode in the at least one B-th touch electrode row is smaller than an area of a touch electrode in the at least one C-th touch electrode row.0

Other aspects of the present disclosure can be understood by those skilled in the art in light of the description, the claims, and the drawings of the present disclosure.

BRIEF DESCRIPTION OF THE DRAWINGS

The following drawings are incorporated in and constitute a part of the specification, illustrating embodiments of the present disclosure, and together with the detailed descriptions serve to explain the mechanism of the present disclosure. Obviously, the drawings in the following description are only exemplary embodiments of the present disclosure. For those of ordinary skill in the art, without paying creative labor, other drawings can be obtained according to the provided drawings.

DETAILED DESCRIPTION

Figure 1:
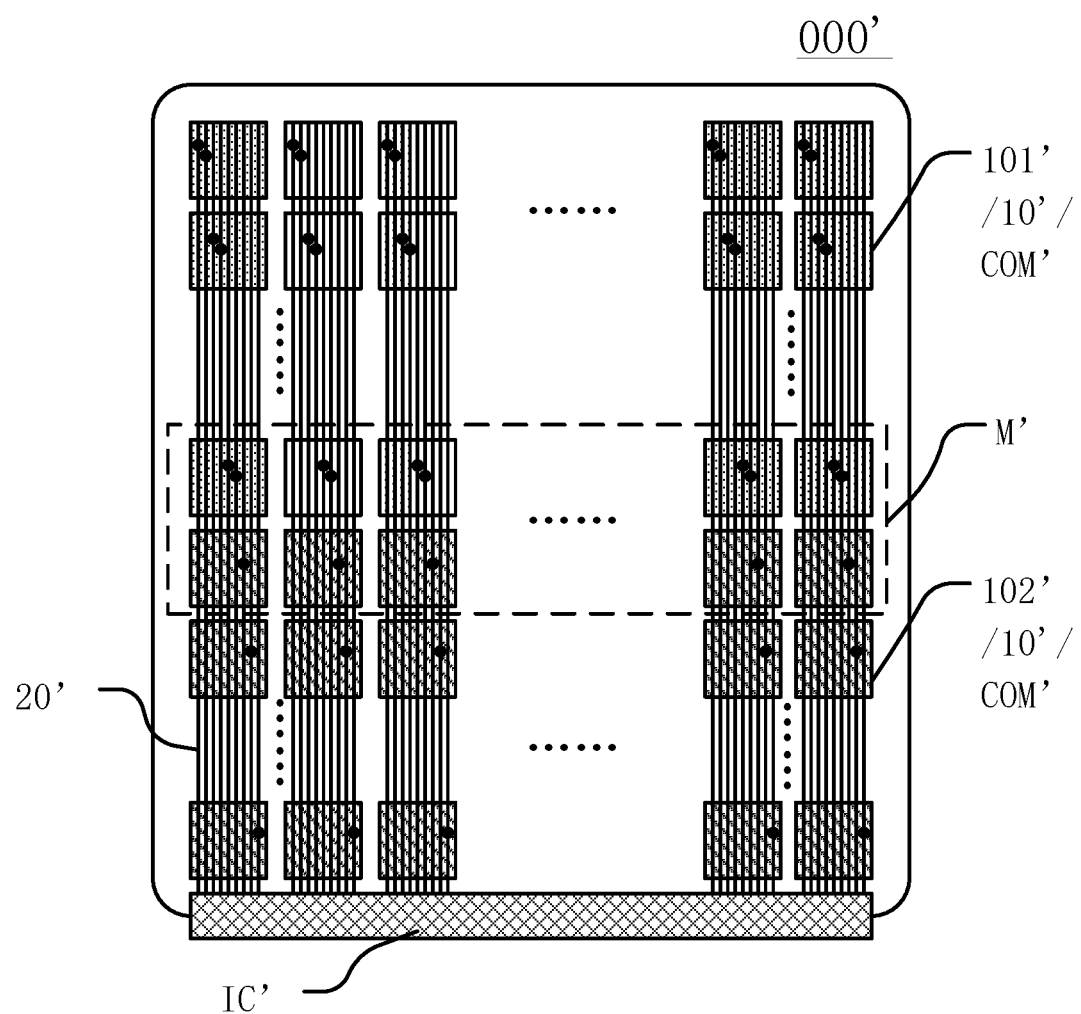
FIG. 1 illustrates a top view of a touch display panel.

Reference will now be made in detail to exemplary embodiments of the disclosure, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all the embodiments of the present disclosure. Based on the disclosed embodiments, persons of ordinary skill in the art may derive other embodiments consistent with the present disclosure, all of which are within the scope of the present disclosure.

The following description of at least one exemplary embodiment is actually merely illustrative, and in no way serves as any limitation on the disclosure and its application or use.

Techniques, methods, and equipment known to those of ordinary skill in the related art may not be discussed in detail, but where appropriate, the techniques, methods and equipment should be considered as part of the specification.

In all examples shown and discussed herein, any specific values should be interpreted as merely exemplary and not limiting. Therefore, other examples of the exemplary embodiment may have different values.

It should be noted that similar reference numerals and letters indicate similar items in the following drawings, therefore, once an item is defined in one drawing, there is no need to discuss it further in subsequent drawings.

Figure 2:
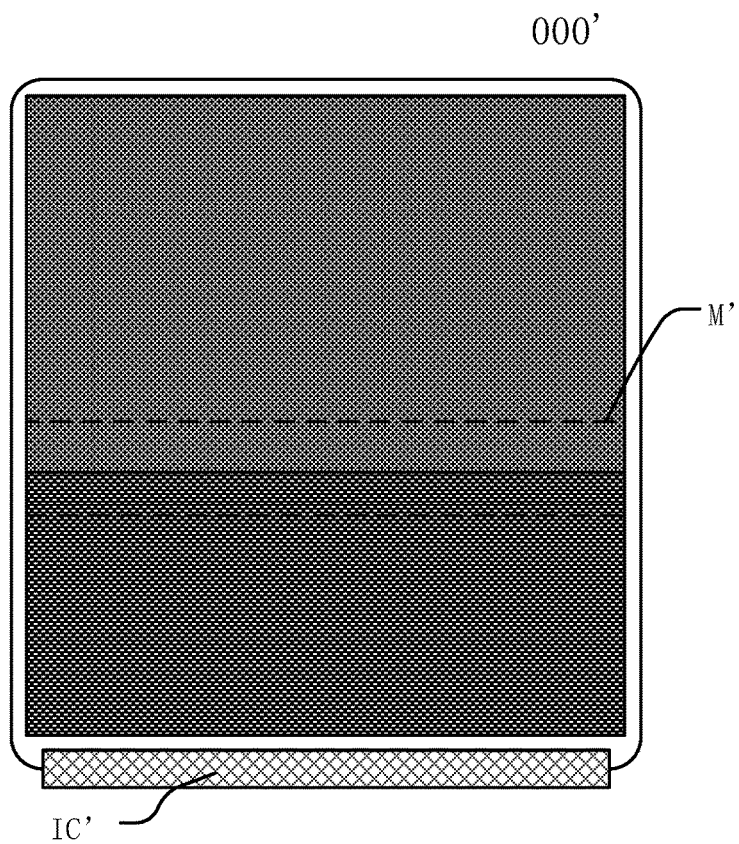
FIG. 2 illustrates a display condition when the touch display panel in FIG. 1 has a split-screen issue.
Figure 3:
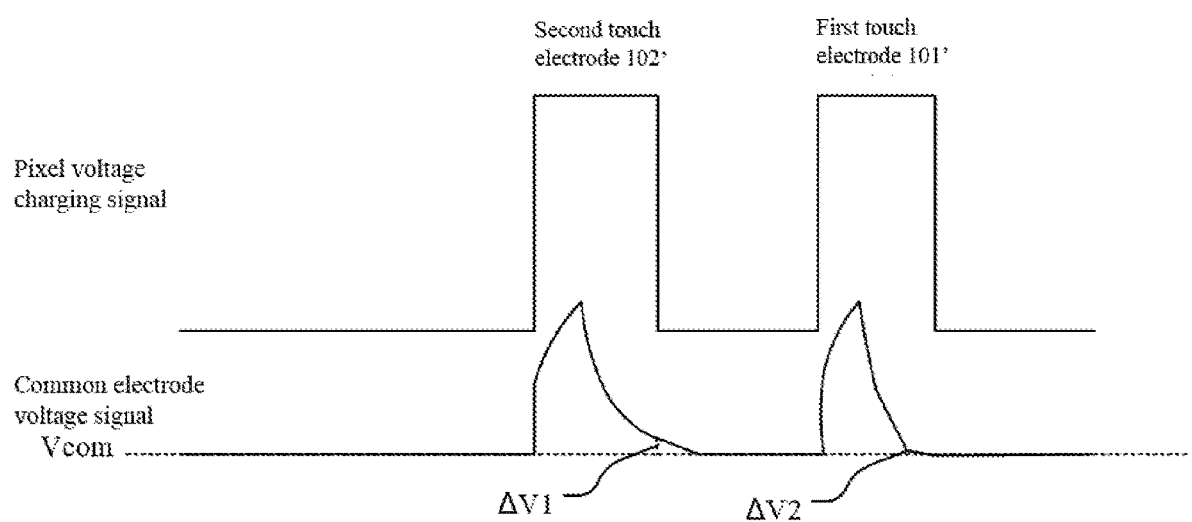
FIG. 3 illustrates the mechanism of the split-screen issue of the touch display panel in FIG. 1 during a display stage.

FIG. 1 illustrates a top view of a touch display panel. FIG. 2 illustrates a display condition when the touch display panel in FIG. 1 has a split-screen issue. FIG. 3 illustrates the mechanism of the split-screen issue of the touch display panel in FIG. 1 during the display stage.

As shown in FIG. 1, the display module 000' includes a plurality of touch electrodes 10' which are arranged as a matrix and have equal area. The plurality of touch electrodes 10' include a plurality of first touch electrodes 101' further away from the driving signal input terminals (usually a driving chip IC' or a flexible circuit board) and a plurality of second touch electrodes 102' adjacent to the driving signal input terminals. Each first touch electrode 101' is connected with two touch signal lines 20'. The touch signals are transmitted between the first touch electrode 101' and the driver chip IC' or the flexible circuit board through the two touch signal lines 20. Each second touch electrodes 102' is connected to a single touch signal line 20', and the touch control signals are transmitted between the second touch electrode 102' and the driving chip IC' or the flexible circuit board through the single touch signal line 20'. The reason for such a design is to reduce the impedance difference of the touch signal lines 20' connected to different touch electrodes 10' at the far and near ends, so as to balance the impedance of the touch signal lines. The second touch electrodes 102' connected by the single touch signal lines 20' and the first touch electrodes 101' connected by the dual touch signal lines 20' have a junction region M'. In the touch display panel 000' in FIG. 1, each touch electrode 10' is used as a touch electrode in the touch stage, and is used transmit a constant signal to be used as a display common electrode COM' in the display stage. Due to the difference in the transmission capacity of the single and dual touch signal lines 20', there may be an unacceptable split-screen issue at the junction region M' when the display panel is performing a display checking, especially for the display check of the Flick pattern of the high frequency ($\geq$120 Hz) project (a special screen for the display panel check, one column of the screen is bright and another one is dark, and all bright pixels in the same frame are of the same polarity). The main reason for the split-screen phenomenon is as following.

When a constant signal is transmitted to the touch electrode 10' (the common electrode) during the display stage, because the pixel voltage disturbs the common electrode during the charging process, after the disturbance, a constant signal is input through the touch signal line 20' to restore the target voltage Vcom. However, there is a difference in the transmission capacity between the single or dual touch signal lines 20', resulting in the inconsistent recovery ability of the touch electrodes 10' connected to the single and the dual touch signal lines 20' to the target voltage. In particular, the differences between the target voltage Vcom that needs to be recovered and the actual recovered voltages is are consistent.

As shown in FIG. 3, the difference between the target voltage Vcom that needs to be restored and the actual restored voltage of the second touch electrode 102' connected to the single touch signal line 20' is ΔV1. The difference between the target voltage Vcom that needs to be restored and the actual restored voltage of the first touch electrode 101' connected to the dual touch signal lines 20' is ΔV2. ΔV1 and ΔV2 are not equal, and ΔV1 is greater than ΔV2. The second touch electrode 102' connected to the single touch signal line 20' recovers to the target voltage Vcom relatively slowly, and the first touch electrode 101' connected to the dual touch signal lines 20' recovers to the target voltage Vcom relatively quickly. Especially at high frequencies, the charging time becomes shorter. In a short time, compared to the first touch electrode 101' connected to the dual signal lines 20', the second touch electrode 102' connected to a single touch signal line 20' is more likely to be unable to recover to the target voltage. In particular, the recovery ability of the second touch electrode 102' connected to the single touch signal line 20' is weaker, and it is easier to have the split-screen phenomenon at the junction region M' (as shown in FIG. 2 and FIG. 3).

The present disclosure provides a touch display panel and a touch display device which can reduce the split-screen display phenomenon, help improve the display quality, and enhance the user experience. The specific embodiments of the touch display panel and the touch display device proposed in the present disclosure are described in detail as follows.

Figure 4:
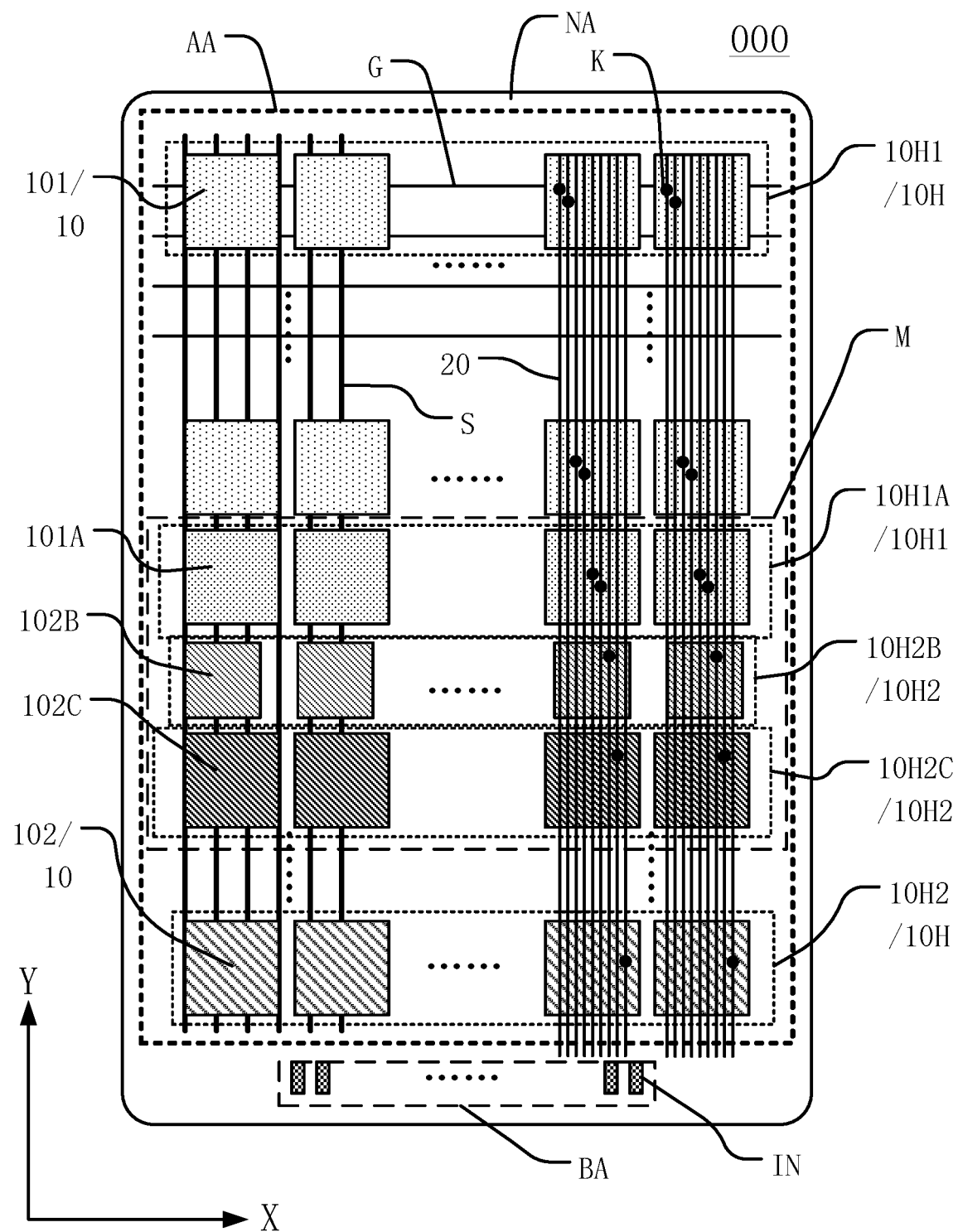
FIG. 4 illustrates a top view of an exemplary touch display panel consistent with various disclosed embodiments of the present disclosure.

FIG. 4 illustrates a schematic diagram of a top view of an exemplary touch display panel consistent with various disclosed embodiments of the present disclosure. As shown in FIG. 4, the touch display panel 000 provided in the present disclosure may include a display area AA and a non-display area NA surrounding the display area AA. The non-display area NA may include a bonding area BA. Along a first direction Y, the bonding area BA may be located on one side of the non-display area NA adjacent to the display area AA. The bonding area BA may include a plurality of signal input terminals IN.

Further, the display area AA may include a plurality of touch electrodes 10 (e.g., touch electrode blocks) arranged as an array. Each touch electrode 10 may be electrically connected to the signal input terminal IN through at least one touch signal line 20. A plurality of touch electrodes 10 arranged along a second direction X may form a touch electrode row 10H, and a plurality of touch electrode rows 10H may be sequentially arranged along the first direction Y. The second direction X may intersect the first direction Y. In one embodiment, the first direction Y and the first direction Y may be perpendicular to each other. The touch display panel 000 may also include a plurality of pixels arranged as an array (not shown), and a plurality of scanning lines G extending along the second direction X, and a plurality of data lines S extending along the first direction Y. The scan lines G and the data lines S are insulated and crossed to define the areas where the pixels are located. Each pixel may include a thin film transistor and a pixel electrode (not shown).

The touch electrode rows 10H may include at least a plurality of first touch electrode rows 10H1 and a plurality of second touch electrode rows 10H2 (in FIG. 4, different filling patterns are used to distinguish the first touch electrode rows: the first touch electrode rows 10H1 are all filled with dot patterns; and the second touch electrode rows 10H2 are all filled with diagonal patterns). Along the first direction Y, the first touch electrode rows 10H1 may be located on the side of the second touch electrode rows 10H2 away from the bonding area BA. In particular, any one first touch electrode row 10H1 may be located on a side of any second touch electrode row 10H2 away from the bonding area BA.

The plurality of touch signal lines 20 connected to each touch electrode 10 of the first touch electrode row 10H1 may be greater than the plurality of touch signal lines 20 connected to each touch electrode 10 of the second touch electrode row 10H2 (it should be noted that, to clearly illustrate the scan lines G, the data lines S, and each touch signal line 20 in FIG. 4, only a portion of the area of the touch electrodes 10 is drawn with the signal lines 20; and also only a portion of the area of the touch electrodes are drawn with scan lines G and data lines S).

In one embodiment, each touch electrode of each first touch electrode row 10H1 may be a first touch electrode 101, and each touch electrode of each second touch electrode row 10H2 may be a second touch electrode 102. The plurality of touch signal lines 20 connected to each first touch electrode 101 is greater than the plurality of touch signal lines 20 connected to each second touch electrode 102. For illustrative purposes, the plurality of touch signal lines 20 connected to each first touch electrode 101 is two, and the plurality of touch signal lines 20 connected to each second touch electrode 102 is one. In particular, each touch electrode in the first touch electrode row 10H1 may be electrically connected to two touch signal lines 20; and each touch electrode in the second touch electrode row 10H2 may be electrically connected to one touch signal line 20. The plurality of the touch signal lines connected to each touch electrode is not specifically limited in the present disclosure.

The plurality of first touch electrode rows 10H1 may include at least one A-th touch electrode row 10H1A adjacent to the second touch electrode row 10H2, and the plurality of second touch electrode rows 10H2 may include at least one B-th touch electrode row 10H2B adjacent to the first touch electrode row 10H1A. The plurality of second touch electrode rows 10H2 may further include at least one C-th touch electrode row 10H2C adjacent to the B-th touch electrode row 10H2B. A, B and C are adjacent positive integers. For example, along the first direction Y, counting along the direction pointing to the signal input terminal IN, the A-th touch electrode row 10H1A, the B-the touch electrode row 10H2B, and the C-th touch electrode row may be the 45th, 46th, and 47th touch electrode rows of the entire touch display panel 000. The plurality of the A-th touch electrode rows 10H1A may be more than one, the plurality of the B-th touch electrode row 10H2B may be more than one, and the plurality of the C-th touch electrode row 10H2C may be more than one. The plurality of the touch electrode rows is not limited by the present, and it can be chosen according to actual needs.

The area of the touch electrode in the B-th touch electrode row 10H2B may be smaller than the area of the touch electrode in the A-th touch electrode row 10H1A, and the area of the touch electrode in the B-th touch electrode row 10H2B may be smaller than the area of the touch electrode in the C-th touch electrode row 10H2C. In one embodiment, to clearly distinguish the touch electrodes of different rows, in the present disclosure, the touch electrode in the A-th touch electrode row 10H1A may be labeled as the touch electrode 101A, the touch electrode in the B-th touch electrode row 10H2B may be labeled as the touch electrode 102B, and the touch electrode in C-th touch electrode row 10H2C may be labeled as the touch electrode 102C. The area of the touch electrode in the present disclosure may be referred to as the area of the orthographic projection of the touch electrode on the light-existing surface of the touch display panel.

Figure 5:
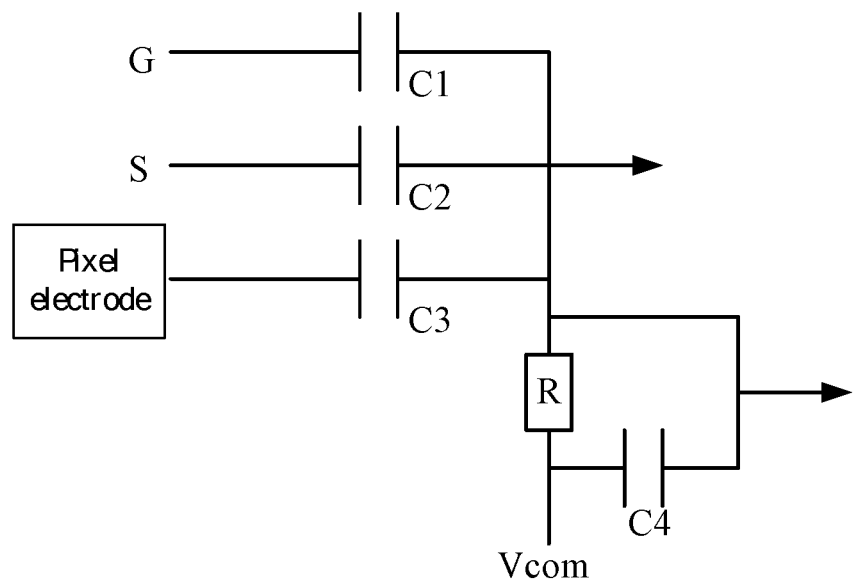
FIG. 5 illustrates a mechanism of each capacitor corresponding to a touch electrode of the touch display panel in FIG. 4.
Figure 6:
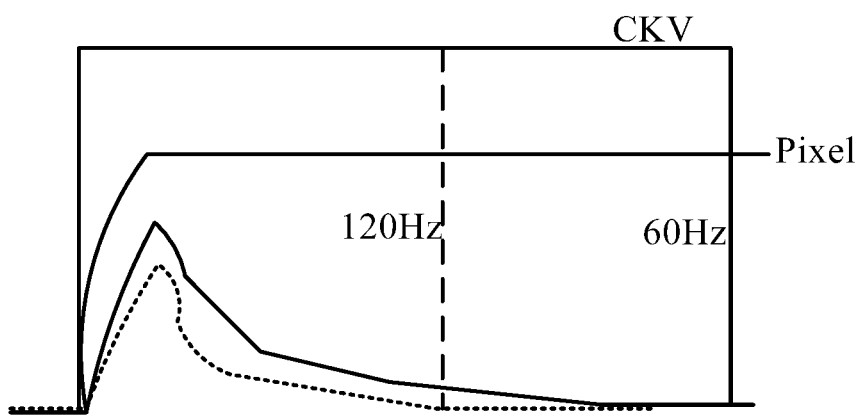
FIG. 6 illustrates a correlation between a high-frequency charging of the touch display panel in FIG. 4 and a voltage of the touch electrode.

FIG. 5 is a schematic diagram of the mechanism of each capacitance corresponding to the touch electrode in the touch display panel in FIG. 4. FIG. 6 is the relationship diagram of the high-frequency charging of the touch display panel and the voltage of the touch electrode. In the touch display panel 000, during the touch stage, each touch electrode may be used as a touch electrode to perform a touch detection function. During the display stage, each touch electrode may be used as a common electrode to transmit constant voltage signal. It can be seen from FIG. 5 that when the touch electrode is used as a common electrode, the main capacitances in the touch display panel may be the capacitance of the scan line G to the touch electrode (C1), and the capacitance of the data line S to the touch electrode (C2), the capacitance of the pixel electrode (not shown) to the touch electrode (C3), the capacitance of the touch signal line to the touch electrode (C4). When the Flick pattern display panel (a special screen for the display panel detection, one column of the screen is bright and one column is dark, and all bright pixels in the same frame have the same polarity) displays the screen detection at a high frequency (≥120 Hz) project, the effective capacitance value of C2 is 0, while the capacitance value of C1 and C4 are far smaller than the capacitance value of C3. Thus, during the pixel voltage charging process, the capacitance value of C3 may play a decisive role in whether the touch electrode (common electrode) can recover to the target voltage Vcom. As shown in FIG. 6, if the refresh frequency of the display screen is increased from 60 Hz to 120 Hz, the charging time of the pixels may be reduced by half. In FIG. 6, the CKV signal may be the switching pulse signal of the scan line G, which may be mainly used to control the charging switch of the pixel. Because $C3=\varepsilon S/4k\pi d$ ($\varepsilon$ is a constant, S is the facing area of the capacitor plates, d is the distance between the capacitor plates, and k is the electrostatic force constant), $\Delta Vcom=\Delta Vpixel\ C3/(C1+C2+C3+C4)$ ($\Delta Vpixel$ is the charging voltage of the pixel). It can be seen that the size of the area of the touch electrode 10 may affect the ability of the voltage of the common electrode to recover to the target voltage. The dotted line in FIG. 6 represents the actual recovery voltage value of the touch electrode with a small area. The solid line indicates the voltage value actually recovered by the touch electrode with a large area. It can be seen that in the high frequency (120 Hz as an example) mode, the touch electrode with a small area may have a strong ability to actually recover the voltage.

Therefore, in the touch display panel 000 provided by the present disclosure, the plurality of touch signal lines 20 connected to each touch electrode 10 of the first touch electrode row 10H1 may be greater than that of each touch electrode of the second touch electrode row 10H2. The first touch electrode row 10H1 may be located on the side of the second touch electrode row 10H2 away from the bonding area BA. The first touch electrode row 10H1 and the second touch electrode row 10H2 may have a junction area M. The plurality of first touch electrode rows 10H1 may include at least one A-th touch electrode row 10H1A adjacent to the second touch electrode row 10H2. The plurality of second touch electrode rows 10H2 may include at least one B-th touch electrode row 10H2B adjacent to the first touch electrode row 10H1. The plurality of second touch electrode rows 10H2 may further include at least one C-th touch electrode row 10H2C adjacent to the B-th touch electrode row 10H2B. The area of the touch electrode in the B-th touch electrode row 10H2B may be smaller than the area of the touch electrode in the A-th touch electrode row 10H1A. The area of the touch electrode in the B-th touch electrode row 10H2B may smaller than the area of the touch electrode in the C-th touch electrode row 10H2C. Such a design may allow the area of the touch electrode 102B of the B-th touch electrode row 10H2B connected to less of touch signal lines 20 at the junction region M to be relatively small; and may be smaller than the area of the touch electrode 101A of the A-th touch electrode row 10H1A connected to the adjacent large number touch signal lines 20; and may also be smaller than the area of the touch electrode 102C of the C-th touch electrode row 10H2C connected to the adjacent smaller number of touch signal lines 20. The area of the touch electrode 102B in the B-th touch electrode row 10H2B may be reduced, and the area directly facing the pixel electrode may be reduced, and the capacitive coupling may be reduced ($C3=\varepsilon S/4k\pi d$). During the pixel voltage charging process at the display stage, the capacitive coupling may be small, the disturbance to the common electrode (also the touch electrode) may be small. Accordingly, it may shorten the time for recovering to the target voltage by inputting constant voltage value to the touch electrode 102B in the touch electrode row 10H2B through the small number of touch signal lines 20. Thus, the recover ability may be kept as consistent as possible with recovery ability of the touch electrode 101A in the A-th touch electrode row 10H1A connected to the large number of touch signal lines 20. In particular, when the screen is displayed, by reducing the area of the touch electrode 102B in B-th touch electrode row 10H2B, and using the area difference compensation design, under a minor design change, the recovered voltages of the common electrodes corresponding to the first touch electrode row 10H1 and the second touch electrode row 10H2 at the junction region M may be as consistent as possible. Thus, the display split-screen phenomenon at the junction region M may be avoided; the display quality may be improved; and the user experience may be enhanced.

It should be noted that FIG. 4 only schematically depicts the structure of the touch display panel. In specific implementation, the structure of the touch display panel is not limited to this, and may include other structure that can realize the functions of the touch display panel, and can be specifically understood with reference to the structure of the display panel in the related art. FIG. 4 is only exemplified by taking the shape of the touch electrode 10 as a square. During the specific implementation, the shape of the touch electrode 10 may not be limited to this, may also be other shapes, and this embodiment does not specifically limit it.

Figure 7:
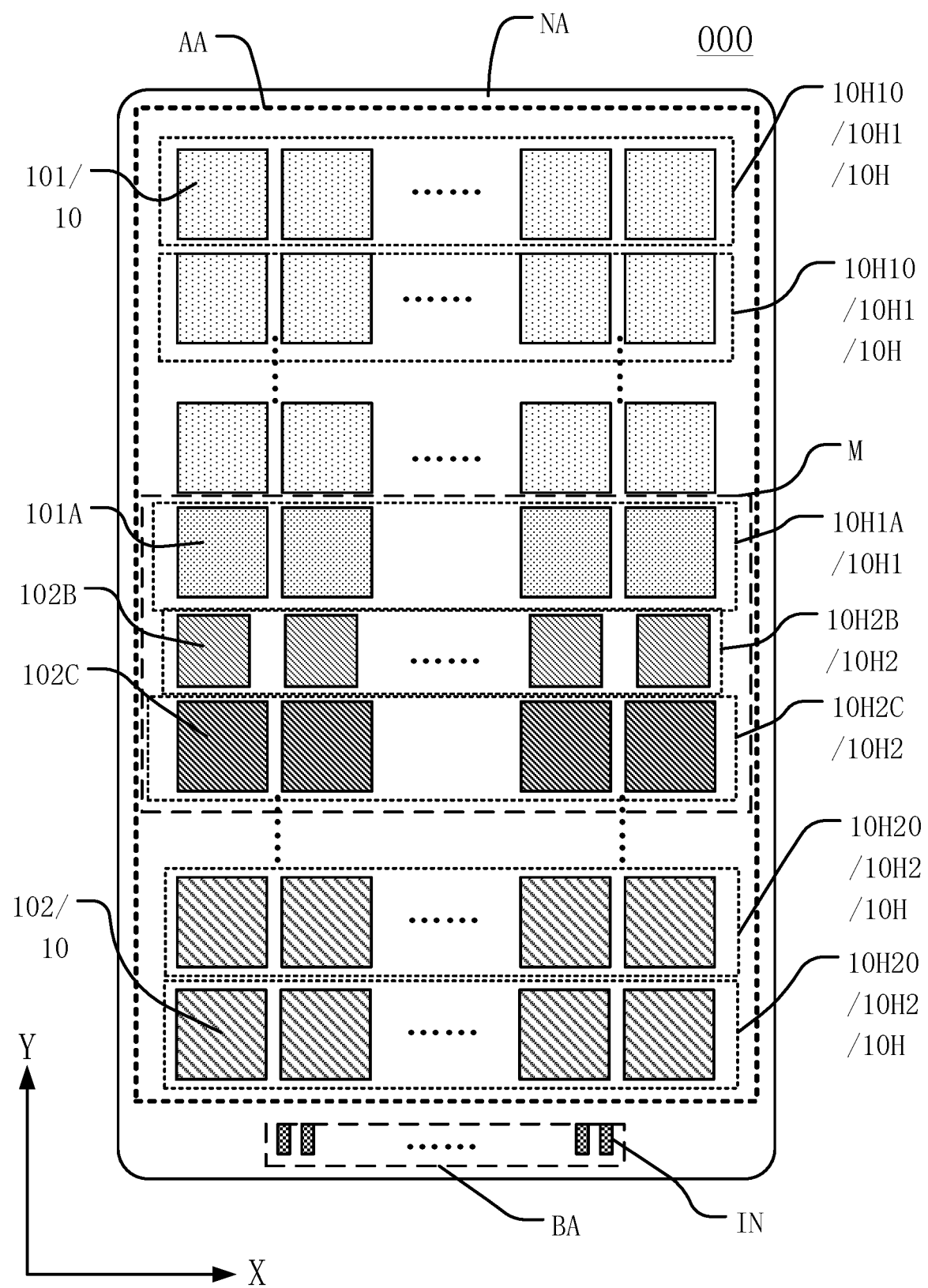
FIG. 7 illustrates a top view of touch electrodes in FIG. 4.

FIG. 7 is a schematic diagram of a top view of the touch electrodes in FIG. 4. As shown in FIG. 7, in one embodiment, any first touch electrode row of the plurality of first touch electrode rows 10H1 other than the A-the touch electrode row 10H1A may be configured as the first sub-touch electrode row 10H10. Any second touch electrode row of the plurality of second touch electrode rows 10H2 other than the B-th touch electrode row 10H2B and the C-th touch electrode row 10H2C may be configured as the second sub-touch electrode rows 10H20.

The area of the touch electrode in the first sub-touch electrode row 10H10 may be equal to the area of the second sub-touch electrode row 10H20.

Thus, in one embodiment, except the touch electrode 101A in the A-the touch electrode row 10H1A at the junction region M of the first touch electrode row 10H1 and the second touch electrode row 10H2, the touch electrode 102B in the B-the touch electrode row 10H2B, and the touch electrode 102C in the C-th touch electrode row 10H2C may have a difference compensation design, the area of the touch electrodes in the remaining touch electrode rows may remain unchanged, and may be equal to each other. In particular, any touch electrode row of the plurality of first touch electrode rows 10H1 other than the A-th touch electrode row 10H1A may be configured as the first sub-touch electrode rows 10H10, and any touch electrode row of the plurality of second touch electrode rows 10H2 other than the B-th touch electrode row 10H2B and the C-the touch electrode row 10H2C may be configured as the second sub-touch electrode row 10H20. The areas of the touch electrodes in the first sub-touch electrode row 10H10 and the second sub-touch electrode row 10H20 may all be equal. Thus, with a less design change, a minor design change may be applied to the original touch electrodes to avoid the display split-screen phenomenon at the junction region. Accordingly, the design of the touch display panel 000 may be simplified.

Figure 8:
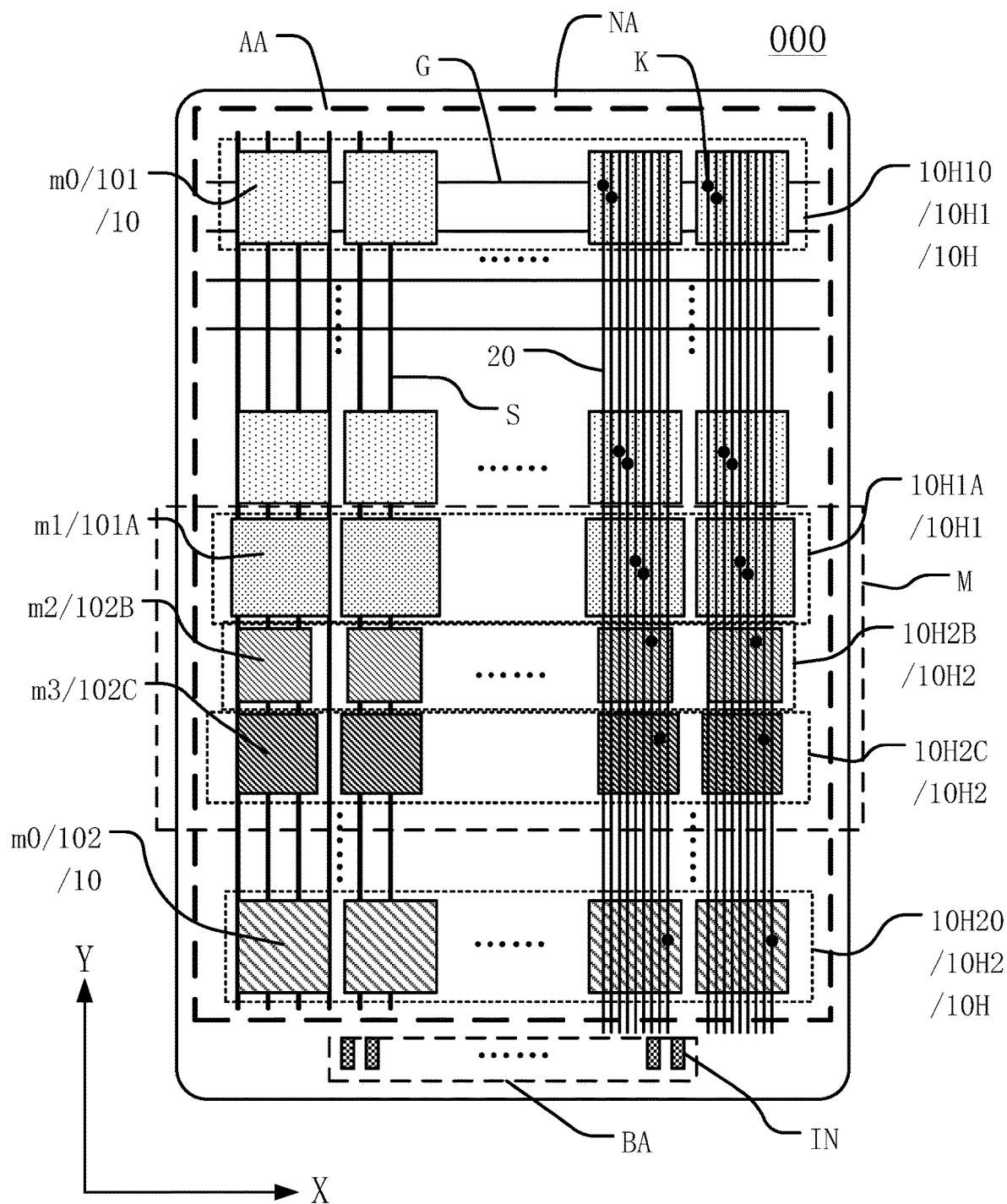
FIG. 8 illustrates a top view of another exemplary touch display panel consistent with various disclosed embodiments of the present disclosure.

FIG. 8 is a schematic diagram of a top view of another exemplary touch display panel consistent with various disclosed embodiments of the present disclosure. In some embodiments, as shown in FIG. 8, the area of the touch electrode 101A in the A-th touch electrode row 10H1A may be greater than m0, and the area of the touch electrode 102B in the B-th touch electrode row 10H2B may be less than m0. m0 may be the area of the touch electrodes in the first sub-touch electrode row 10H10 and the second sub-touch electrode row 10H20.

Thus, in one embodiment, by designing the area of the touch electrode 101A in the A-th touch electrode row 10H1A at the junction region M of the B-th touch electrode row 10H2B of the display panel 000 connected by a small number of touch signal lines 20 and the A-th touch electrode row 10H1A connected with a large number of touch signal lines 20 to be greater than m0, and the area of the touch electrode 102B in the B-th touch electrode row 10H2B to be smaller than m0, while decreasing the area of the touch electrode 102B in the B-th touch electrode row 10H2B, the area of the touch electrode 101A in the A-th touch electrode row 10H1A may be appropriately increased. Accordingly, while increasing the target voltage recovery capability of the touch electrode 102B in the B-th touch electrode row 10H2B connected by a smaller number of touch signal lines 20, the target voltage recovery ability of the touch electrode 101A in the A-th touch electrode row 10H1A connected by a larger number of touch signal lines 20 may also be reduced. With the cooperation of an increase and a decrease, the consistency of the recovered voltage values of the common electrodes corresponding to the junction region M of the first touch electrode row 10H1 and the second touch electrode row 10H2 may be further increased. Thus, the split-screen phenomenon may be further reduced, the display quality may be improved, and the user experience may be further enhanced.

It should be noted that such an embodiment does not specifically limit the area of the touch electrode 102C of the C-th touch electrode row 10H2C that is adjacent to the B-th touch electrode row 10H2B. As shown in FIG. 8, the area of the touch electrode 102C of the C-th touch electrode row 10H2C may be greater than the area of the touch electrode 102B in the B-th touch electrode row 10H2B, but it may still need to be smaller than m0. In some embodiments, the area of the touch electrode 102C in the C-th touch electrode row 10H2C may be greater than the area of the touch electrode 102B in the B-th touch electrode row 10H2B, and also be slightly greater than m0. In particular, the area of the touch electrode 102C in the C-th touch electrode row 10H2C may only need to be larger than the area of the touch electrode 102B in the B-th touch electrode row 10H2B to reduce the split-screen phenomenon at the junction region M. Whether the area of the touch electrode 102C in the C-th touch electrode row 10H2C needs to be greater than or less than or equal to m0 may not be specifically limited and, in the specific implementation, it can be selected and set according to actual requirements.

Figure 9:
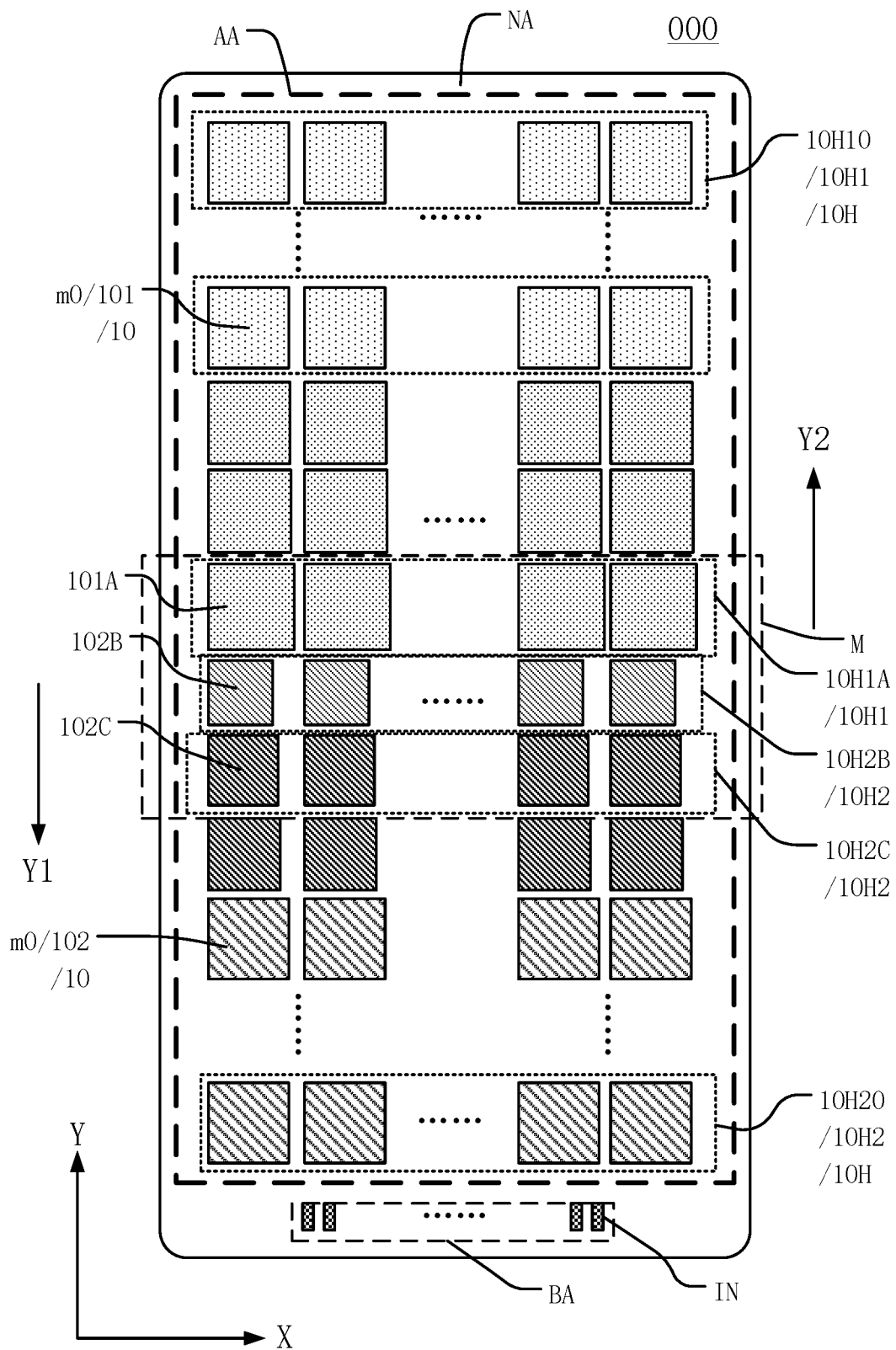
FIG. 9 illustrates a top view of touch electrodes in FIG. 8.

FIG. 9 is a schematic diagram of a top view of the touch electrodes in FIG. 8. As shown in FIG. 8 and FIG. 9, in some embodiments, the number of rows of the A-th touch electrode row 10H1A may be greater than one. The number of rows of the C-th touch electrode row 10H2C may be greater than one.

Along the first direction Y, along the direction Y1 in which the first touch electrode row 10H1 points to the second touch electrode row 10H2, the area of the touch electrode of each touch electrode row in the plurality of C-th touch electrode rows 10H2C may be gradually increased to m0. Along the direction Y2 in which the second touch electrode row 10H2 points to the first touch electrode row 10H1, the area of the touch electrode of each touch electrode row in the plurality of A-th touch electrode rows 10H1A may be gradually decreased to m0.

Thus, in one embodiment, the number of rows of the A-th touch electrode row 10H1A among the plurality of first touch electrode rows 10H1 may be more than one (e.g., three are shown in FIG. 9), and the number of the rows of the C-th touch electrode row 10H2C among the plurality second touch electrode rows 10H2 may be more than one (two are shown in FIG. 9). Along the first direction Y, along the direction Y1 in which the first touch electrode row 10H1 points to the second touch electrode row 10H2, the area of the touch electrode of each touch electrode row in the plurality of C-th touch electrode rows 10H2C may be gradually increased to m0. In particular, the area of the touch electrode of each touch electrode row in the plurality of C-th touch electrode rows 10H2C may be gradually increased to the area m0 of the touch electrodes in the first sub-touch electrode row 10H10 and the second sub-touch electrode row 10H20. Along the direction Y2 in which the second touch electrode row 10H2 points to the first touch electrode row 10H1, the area of the touch electrode of each touch electrode row in the plurality of A-th touch electrode rows 10H1A may be gradually decreased to m0. In particular, the area of the touch electrode of each touch electrode row in the plurality of A-th touch electrode row 10H1A may be gradually reduced to the area m0 of the touch electrodes of the first sub-touch electrode row 10H10 and the second sub-touch electrode row 10H20. Thus, while reducing the area of the touch electrode 102B in the B-th touch electrode row 10H2B, the areas the touch electrodes of each touch electrode row in the upper and lower positions of the B-th touch electrode row 10H2B at the junction region M may be gradually increased or gradually decreased. Thus, the visual split-screen phenomenon may be reduced.

In some embodiments, as shown in FIG. 8 and FIG. 9, the area of the touch electrode 102C in the C-th touch electrode row 10H2C may be smaller than m0.

Thus, in one embodiment, in the second touch electrode row 10H2, the area of the touch electrode 102C in the C-th touch electrode row 10H2C adjacent to the B-th touch electrode row 10H2B may be set to be smaller than the area m0 of the first sub touch electrode row 10H10 and the second sub-touch electrode row 10H20. Because the area of the touch electrode 102B in the B-the touch electrode row 10H2B is smaller than m0, although the area of the touch electrode 102C in the C-th touch electrode row 10H2C is larger than the area of the touch electrode 102B in the B-th touch electrode row 10H2B, it is still smaller than that area m0 of the touch electrode of the first sub-touch electrode row 10H10 and the second sub-touch electrode row 10H20. Thus, the area of the touch electrode 102B in the B-th touch electrode row 10H2B to the area m0 of the touch electrode of the second sub touch electrode row 10H20 may have a gradually increased transition. Accordingly, while avoiding the splitting-screen, the display quality of the touch display panel may be improved.

In one embodiment, assuming that the area of the touch electrode 101A in the A-th touch electrode row 10H1A is m1, then m1=m0×110%. Assuming that the area of the touch electrode 102B in the B-th touch electrode row 10H2B is m2, then m2=m0×85%. Assuming that the area of the touch electrode 102C in the C-th the touch electrode row 10H2C is m3, then m3=m0×95%. Thus, while the requirements that the area of the control electrode 102B of the touch electrode row 10H2B is smaller than the area of the touch electrode 101A in the A-th touch electrode row 10H1A, and the area of the touch electrode 102B in the B-th touch electrode row 10H2B is smaller than the area of the touch electrode 102C in the C-th touch electrode row 10H2C may be met, the area of the touch electrode 101A in the A-th touch electrode row 10H1A may be greater than m0, and the area of the touch electrode 102C in the C-th touch electrode row 10H2C may be smaller than m0. Along the direction Y2 in which the second touch electrode row 10H2 points to the first touch electrode row 10H1, the area of the touch electrode 101A in the A-th touch electrode row 10H1A of the plurality of first touch electrode rows 10H1 may be gradually reduced from being greater than the area m0 of the touch electrode in the first sub-touch electrode row 10H10. Along the direction Y1 in which the first touch electrode row 10H1 points to the second touch electrode row 10H2, in the plurality of second touch electrode rows 10H2, from the B-th touch electrode row 10H2B to the C-th touch electrode row 10H2C, the area of the touch electrode 102B may be gradually increased from being smaller than the area m0 to the area m0 of the second sub-touch electrode rows 10H20. Thus, the splitting-screen issue may be avoided, and the display quality of the touch display panel may be improved.

In some embodiments, as shown in FIG. 8 and FIG. 9, the area of the touch electrode 101A in the A-th touch electrode row 10H1A may be m1, and m1=m0×a %. The area of touch electrode 102B in the B-th touch electrode row 10H2B may be m2, and m2=m0×b %. The area of the touch electrode 102C in the C-the touch electrode row 10H2C may be m3, and m3=m0×c %. a>100, b<100, 10≤a−b≤25, and c−b≤25.

Thus, in one embodiment, the area m1 of the touch electrode 101A in the A-th touch electrode row 10H1A, the area m2 of the touch electrode 102B in the B-th touch electrode row 10H2B, and the area m3 of the touch electrode 102C in the C-th touch electrode row 10H2C at the junction region M1 may satisfy that m1=m0×a %, m2=m0×b %, and m3=m0×c %. m0 is the area m0 of the touch electrode in the first sub-touch electrode row 10H10 and the second sub-touch electrode row 10H20. In particular, while the area m1 of the touch electrode 101A in the A-th touch electrode row 10H1A may be greater than m0, the area m2 of the touch electrode 102B touch in the B-th touch electrode row 10H2B may be smaller than m0, and the area m3 of the touch electrode 102C in the C-th touch electrode row 10H2C C may be greater than the area m2 of the touch electrode 102B in the B-th touch electrode row 10H2B, 10≤a−b≤25, the area difference ratio between m1 and m2 may be less than or equal to 25% and greater than or equal to 10%, c−b≤25, and the area difference ratio between m3 and m2 may be less than or equal to 25%. Thus, the occurrence of split-screen issue may be further avoided.

To clearly illustrate the beneficial effect of the present disclosure under the conditions that the area of the touch electrode 101A in the A-th touch electrode row 10H1A may be m1, m1=m0×a %; the area of the touch electrode 102B in the B-th touch electrode row 10H2B may be m2, m2=m0×b %; the area of the touch electrode 102C of the C-th touch electrode row 10H2C may be m3, m3=m0×c %; and a>100, b<100, 10≤a−b≤25, and c−b≤25, a statistical comparison of the split-screen issue caused by the area difference in the display panel with a refresh frequency of 120 Hz is illustrated as follows:

| Resolution (Vertically displayed number of pixels in each inch) | Weather there is a split screen issue (Y/N) | Area ratio of a certain touch electrode row | Area ratio of the touch electrode of the touch electrode adjacent to the certain touch electrode row | Area difference ratio |
| --- | --- | --- | --- | --- |
| 2400 | Y | 54.89% | 100% | 45.11% |
| 2340 | N | 77.3% | 97.8% | 20.5% |
| 2340 | Y | 54.17% | 100% | 45.83% |
| 2340 | N | 77.71% | 100% | 22.29% |
| | N | 82.63% | 100% | 17.37% |
| | N (substantially minor, or no) | 76.54% | 101.5% | 24.96% |
| 2400 | Y (minor) | 82.88% | 96.95% | 14.07% |
| | N | 86.79% | 96.95% | 10.16% |

As shown in the above table, it may be concluded that when the area difference ratio of the touch electrodes in adjacent rows is in a range of approximately 10%-25%, there may be not split-screen issue. In particular, the range of 10.16%-24.96% may be a safe value range.

According to the experiment, in one embodiment, the area of the touch electrode 101A of the A-th touch electrode row 10H1A may be designed as m1, and m1=m0×110%. The area of the touch electrode 102B of the B-th touch electrode row 10H2B may be designed as m2, and m2=m0×90%. The area of the touch electrode 102C of the C-th touch electrode row may be designed as m3, and m3=m0×100%.

Thus, in one embodiment, the area m1 of the touch electrode 101A in the A-th touch electrode row 10H1A may be greater than the area m2 of the touch electrode 102B in the B-th touch electrode row 10H2B. The area m1 of the touch electrode 101A in the A-th touch electrode 10H1A may be greater than the area m0 of the touch electrode in the first sub-touch electrode row 10H10. The area m2 of the touch electrode 102B in the B-th touch electrode row 10H2B may be smaller than the area m0 of the touch electrode in the second sub-touch electrode row 10H20. m1=m0×110%, and m2=m0×90%. Further, the area m3 of the touch electrode 102C in the C-th touch electrode row 10H2C may be equal to the area m0 of the touch electrode in the second sub-touch electrode row 10H20. Thus, only the area m1 of the touch electrode 101A of the A-th touch electrode row 10H1A and the area m2 of the touch electrode 102B the B-th touch electrode row 10H2B may need to be changed to allow the area change to be as small as possible. Thus, while avoiding the display split-screen phenomenon at the junction region M, the design of the touch display panel 000 may be simplified. Through experimental verification, when the area m1 of the touch electrode 101A in the A-th touch electrode row 10H1A may be designed to be equal to m0×110%, the area m2 of the touch electrode 102B in the B-th touch electrode row 10H2B may be designed to be equal to m0×90%, and the area m3 of the touch electrode 102C in the C-th touch electrode row may be designed to be equal to m0×100%, the effect of avoiding the split-screen issue may be particularly obvious; and such a design may be better applied to the actual product design.

Figure 10:
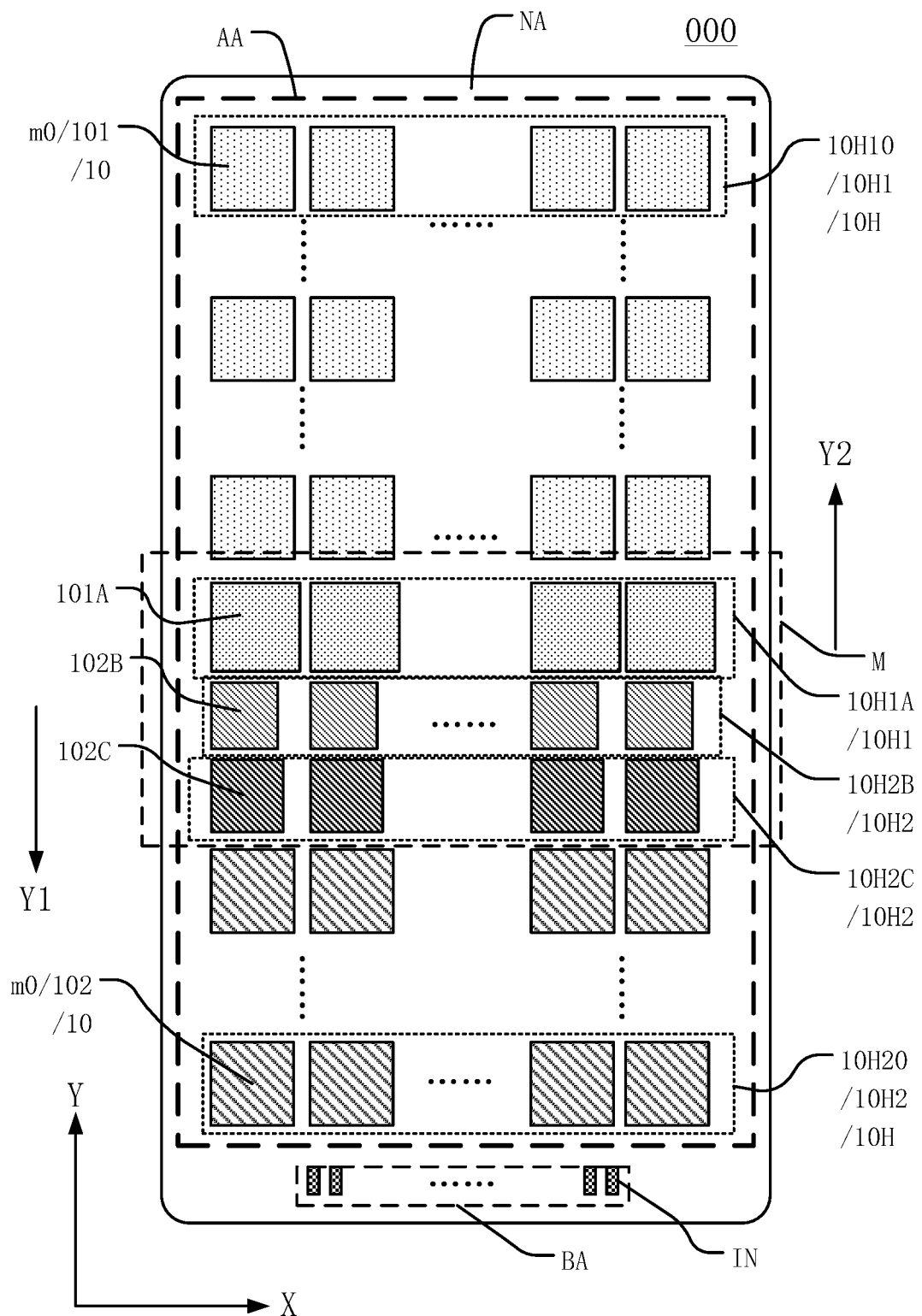
FIG. 10 illustrates another top view of touch electrodes in FIG. 8.

FIG. 10 is a schematic diagram of a top view of other exemplary touch electrodes in FIG. 8. As shown in FIG. 8 and FIG. 10, In some embodiments, an A-th touch electrode row 10H1A, a B-th touch electrode row 10H2B and a C-th touch electrode row 10H2C may be sequentially adjacent along the first direction Y.

Thus, the number of the A-th touch electrode rows 10H1A, the number of the B-th touch electrode rows 10H2B, and the number of C-th touch electrode rows 10H2C may be only one. The one A-th touch electrode row 10H1A, the one B-th touch electrode row 10H2B and the one C-th touch electrode row may be sequentially arranged next to each other along the first direction Y. Thus, while avoiding the split-screen phenomenon and the design difficulty of the touch display panel may be reduced, and the manufacturing efficiency of the touch display panel may be improved.

Figure 11:
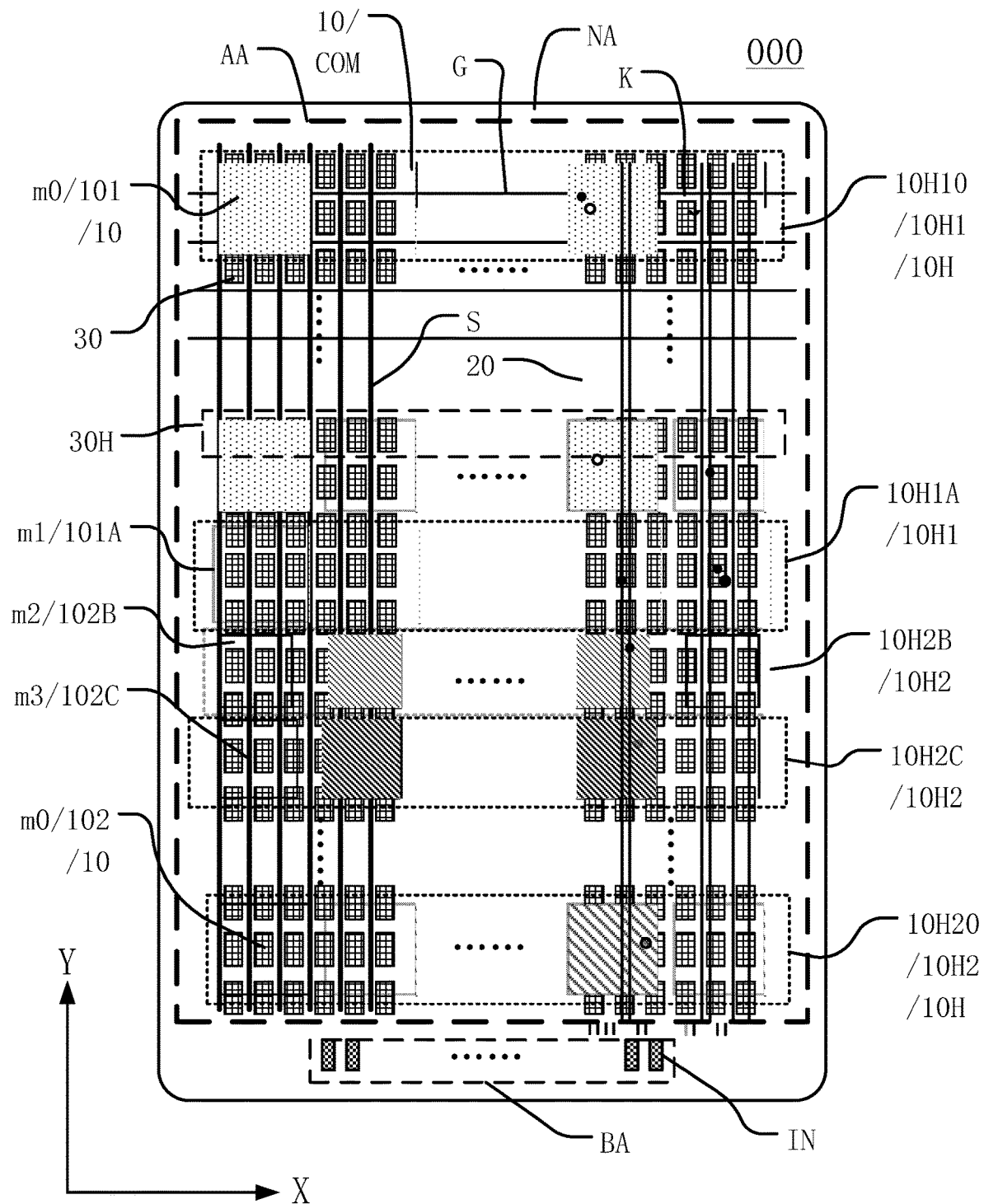
FIG. 11 illustrates a top view of another exemplary touch display panel consistent with various disclosed embodiments of the present disclosure.

FIG. 11 is a top view of another exemplary touch display panel consistent with various disclosed embodiments of the present disclosure. (It is understandable that, to clearly illustrate the positional relationship between the touch electrode rows 10H and the pixel rows 30H, in FIG. 11, the touch electrode rows 10H are filled with transparency). In one embodiment, the display area AA may further include a plurality of pixels 30 arranged as an array. A plurality of pixels 30 arranged along the second direction X may form a pixel row 30H, and plurality of pixel rows 30H may be sequentially arranged along the first direction Y.

Along the direction perpendicular to the light-existing surface of the touch display panel 000, one touch electrode row 10H and a plurality of pixel rows 30H may overlap each other. In one embodiment, the touch display panel 000 further includes a common electrode COM, and the touch electrode 10 may be multiplexed as the common electrode COM.

Thus, in one embodiment, the display area AA of the touch display panel 000 may also include a plurality of pixels 30 arranged as an array. The plurality of pixels 30 arranged along the second direction X may form a pixel row 30H, and a plurality of pixel rows 30H may be arranged in sequence along the first direction Y. The orthographic projection of one touch electrode row 10H on the light-existing surface of the touch display panel 000 may overlap with the orthographic projection of a plurality of pixel rows 30H on the light-existing surface of the touch display panel 000. In particular, one touch electrode row 10H may be correspondingly disposed to the plurality of pixel rows 30H. Accordingly, the touch electrode 10 of the touch electrode row 10H may be multiplexed as the common electrode COM during the display stage of the touch display panel 000. Thus, the number of the common electrodes COM may be reduced, and the requirements of touch accuracy may be met.

Figure 12:
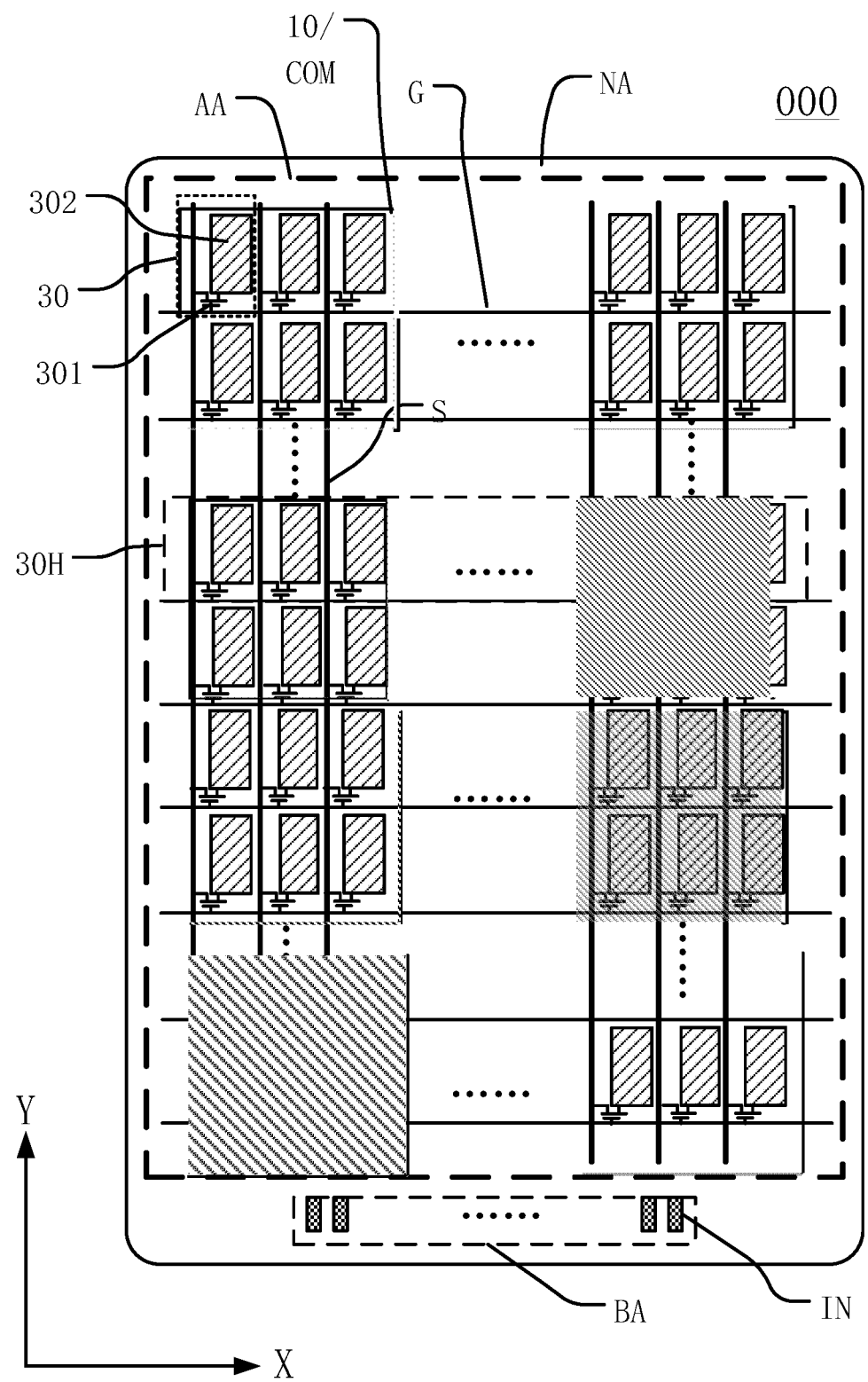
FIG. 12 illustrates a top view of another exemplary touch display panel consistent with various disclosed embodiments of the present disclosure.

FIG. 12 is a schematic diagram of a top view of another exemplary touch display panel consistent with various disclosed embodiments of the present disclosure. (It is understandable that, to clearly show the positional relationship between the common electrode COM and the pixels 30, FIG. 12 shows the transparent filling of the common electrode COM). As shown in FIG. 12, in some embodiments, the touch display panel 000 may also include a plurality of scan lines G extending along the second direction X, and a plurality of data lines S extending along the first direction Y. Each pixel 30 may include a thin-film transistor 301 and a pixel electrode 302. The gate of the thin-film transistor 301 may be electrically connected to the scan line G, and the source of the thin-film transistor 301 may be electrically connected to the data line S. The drain of the thin-film transistor 301 may be electrically connected to the pixel electrode 302.

Thus, in one embodiment, the structure of the touch display panel 000 may include a plurality of scan lines G extending along the second direction X and a plurality of data lines S extending along the first direction Y. The scan lines G may be used to provide scan driving signals to each pixel 30 through the multiple signal input terminals IN in the bonding area BA. The data lines S may be used to provide data voltage signals to each pixel 30 through the multiple signal input terminals IN in the bonding area BA. The thin-film transistor 301 may be used to transmit a voltage signal to the pixel electrode 302 to form an electric field between the pixel electrode 302 and the common electrode COM so as to realize the display function of the touch display panel 000.

In some embodiments, referring to FIG. 4, FIG. 8, and FIG. 11, the touch electrode 10 and the touch signal line 20 may be disposed on different layers of the touch display panel 000. The electrode 10 and the touch signal line 20 may be electrically connected through at least one via K.

Thus, in one embodiment, the touch electrode 10 and the touch signal line 20 may be disposed on different film layers of the touch display panel 000. Thus, while avoiding short-circuits between the multiple touch signal lines 20, it may also make the touch signal line 20 as wide as possible to reduce the impedance of the touch signal line 20. Accordingly, the touch effect may be improved. Further, when the touch electrode 10 and the touch signal line 20 are disposed on different layers of the touch display panel 000, the touch electrode 10 and the touch signal line 20 may be electrically connected through at least one via K. For example, one touch signal line 20 may be electrically connected to the same touch electrode 10 through at least two vias K, the stability of the electrical connection may be improved.

Further, refer to FIGS. 4, 8 and 11, in some embodiments, the touch display panel 000 may be a self-capacitive touch display panel.

Thus, in one embodiment, the touch display panel 000 may be a self-capacitive touch display panel. The touch principle of the self-capacitance mode is based on the capacitance between the touch electrode 10 and the corresponding ground. When an excitation signal is applied to the touch electrode 10 through the touch signal line 20, due to the existence of self-capacitance, an electric field that changes with the excitation signal may be generated between the touch electrode 10 and the ground. Thus, the touch detection may be realized. For details, please refer to the touch detection structure and principle of the self-capacitance mode in the related art for further understanding.

Further, referring to FIG. 4, FIG. 8, and FIG. 11, in some embodiments, the material of the touch electrode 10 may include semiconductor transparent conductive film made of indium tin oxide.

In such embodiments, the material of the touch electrode 10 may include semiconductor transparent conductive film made of indium tin oxide (ITO) and may also include antimony doped tin oxide transparent conductive film (ATO). The material of the touch electrode 10 is not specifically limited in the present disclosure, as long as the material of the touch electrode 10 may be conductive and transparent.

Figure 13:
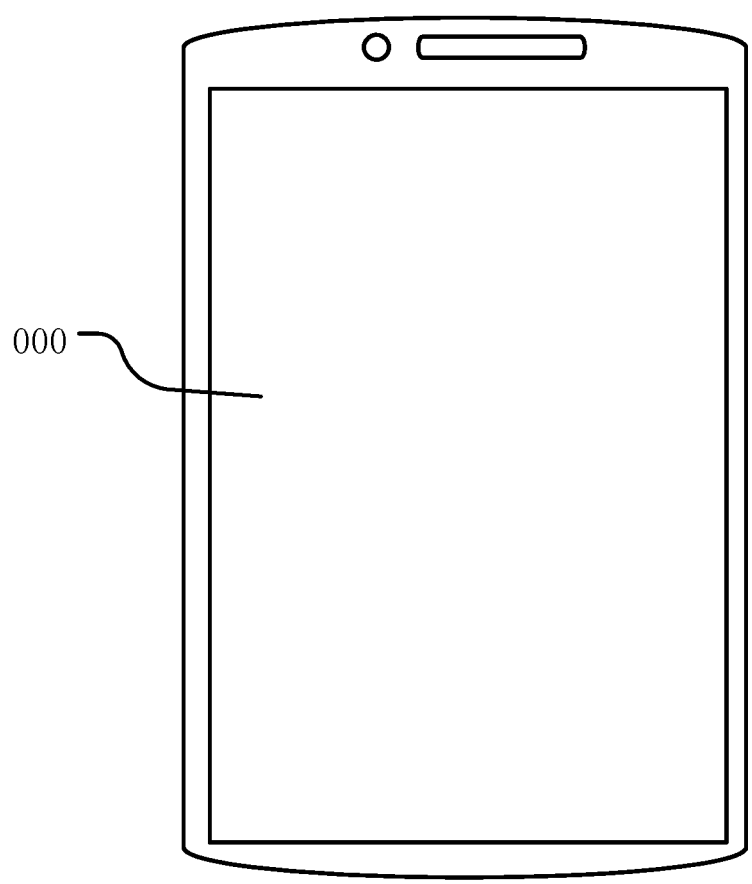
FIG. 13 illustrates an exemplary touch display device consistent with various disclosed embodiments of the present disclosure.

FIG. 13 is a schematic diagram of a top view of an exemplary touch display device consistent with various disclosed embodiments. As shown in FIG. 13, the touch display device 111 provided in the present disclosure may include the present disclosed touch display panel 000, or other appropriate touch display panel. FIG. 13 only uses a mobile phone as an example to describe the touch display device 111. It is understandable that the touch display device 111 provided by the present disclosure may be a computer, a TV, a vehicle-mounted display device, or other devices having display functions. The type of the touch display device 111 is not specifically limited in the present disclosure. The touch display device 111 provided by the present disclosure may have at least of the beneficial effects of the touch display panel 000 provided by the present disclosure. The details may refer to the specific descriptions of the touch display panel 000 in the previous embodiments.

Figure 14:
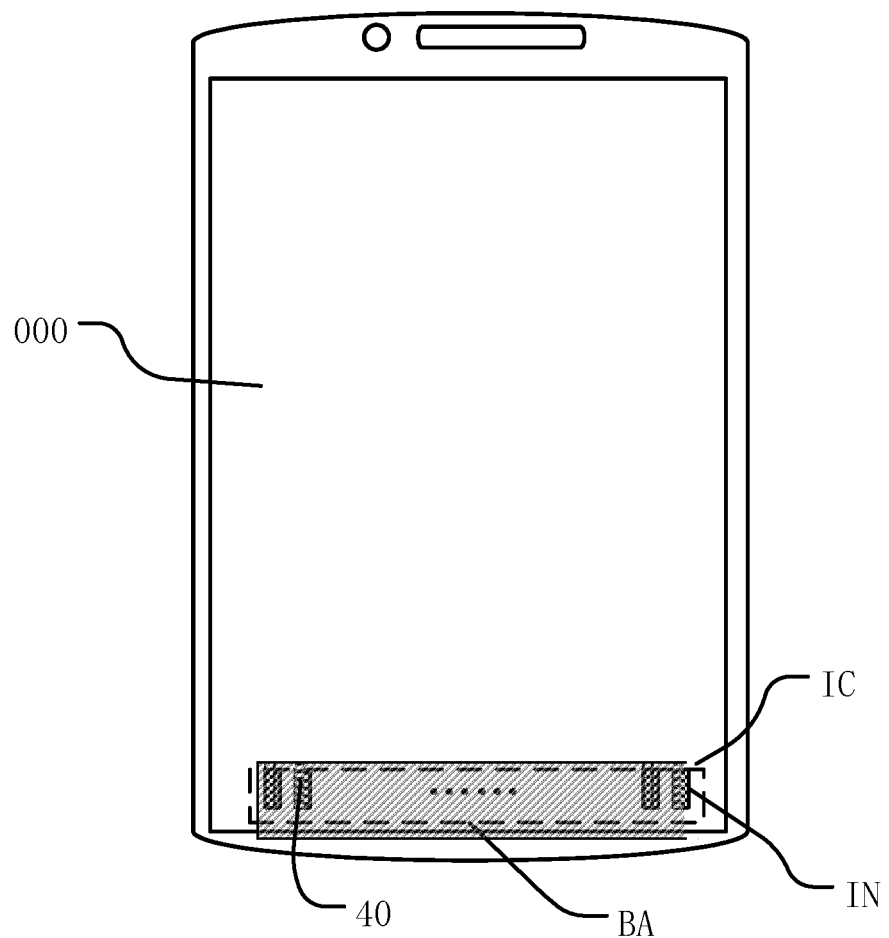
FIG. 14 illustrates another exemplary touch display device consistent with various disclosed embodiments of the present disclosure.

FIG. 14 is a schematic diagram of a top view of another exemplary touch display device consistent with various disclosed embodiments of the present disclosure. (It is understandable that, to clearly show that bonding relationship between the driving chip IC and the touch display panel 000, the structure of the driving chip IC is filled with transparency in FIG. 14). As show in FIG. 14, the touch display device 111 may include a driving chip IC. The driving chip IC may include a plurality of output pins 40. The output pins 40 may be electrically connected to the multiple signal input terminals IN in the bonding area BA one by one.

In such an embodiment, the bonding area BA of the touch display panel 000 may be bonded with and electrically connected to the driving chip IC. The driving chip IC may include a plurality of output pins 40. By bonding and electrically connecting the plurality of output pins 40 of the driving chip IC with and to the multiple signal input terminals IN of the bonding area BA in a one-to-one correspondence, driving signals (which may be touch signals and data voltage signals, etc.) may be provided to the touch display panel 000 through the driving chip IC. The driving chip IC bonded on the touch display device 111 may be replaced with a flexible circuit board, etc. During specific implementation, it can be selected and set according to actual needs.

Thus, the touch display panel and the touch display device provided by the present disclosure may achieve at least the following beneficial effects.

In the touch display panel, the number of touch signal lines connected to each touch electrode of the first touch electrode row may designed to be greater than the number of touch signal lines connected to each touch electrode of the second touch electrode row. The first touch electrode row may be located on the side of the second touch electrode row away from the bonding area, and there is a junction region between the first touch electrode row and the second touch electrode row. The plurality of first touch electrode rows may include at least one A-th touch electrode row adjacent to the second touch electrode row, and the plurality of second touch electrode rows may include at least one B-th touch electrode row adjacent to the first touch electrode row. The plurality of second touch electrode rows may further include at least one C-th touch electrode row adjacent to the B-th touch electrode row. The area of the touch electrode of the B-th touch electrode row may be smaller than the area of the touch electrode of the A-th touch electrode row, and the area of the touch electrode in the B-th touch electrode row may be smaller than the area of the touch electrode in the C-th touch electrode row. Such a configuration may reduce the area of the touch electrode in the B-th touch electrode row connected by a smaller number of touch signal lines in the junction region. Accordingly, the area directly faces to the pixel electrode may be reduced, and the capacitive coupling may be reduced. In the process of voltage charging, the capacitive coupling may be substantially small. Thus, the disturbance to the common electrode (also the touch electrode) may be substantially small. When the disturbance is substantially small, the time for recovering to the target value by inputting a constant voltage value to the touch electrode in the B-th touch electrode row B through the small number of touch signal lines may be shorten. Accordingly, the recovery ability of the touch electrodes in the A-th touch electrode row connected with the larger number of touch signal lines may be as consistent as possible. In particular, when the screen is displaying, the area of the touch electrode in the B-th touch electrode row may be reduced.

The present disclosure cleverly uses the area difference compensation design of the touch electrodes. With minor design changes, it may facilitate the recovered voltage values of the common electrodes corresponding to the first touch electrode row and the second touch electrode row at the junction region to be as consistent as possible. Thus, the display split-screen phenomenon at the junction region may be avoided, the display quality may be improved, and the user experience may be enhanced.

Although some specific embodiments of the present disclosure have been described in detail through examples, those skilled in the art should understand that the above examples are only for illustration, not for limiting the scope of the present disclosure. Those skilled in the art should understand that the above embodiments can be modified without departing from the scope and spirit of the present invention. The scope of the invention is defined by the appended claims.

What is claimed is:

1. A touch display panel, comprising:
   a display area; and
   a non-display area surrounding the display area,
   wherein:
   the non-display area includes a bonding area;
   along a first direction, the bonding area is located on a side of the non-display area adjacent to the display area;
   the bonding area includes a plurality of signal input terminals;
   the display area includes a plurality of touch electrodes arranged as an array;
   each touch electrode of the plurality of touch electrodes is electrically connected to a corresponding signal input terminal of the plurality of signal input terminals through at least one touch signal line;
   a number of the plurality of touch electrodes arranged along a second direction that intersects the first direction form a touch electrode row;
   a plurality of touch electrode rows are sequentially arranged along the first direction;
   the plurality of touch electrode rows include at least a plurality of first touch electrode rows and a plurality of second touch electrode rows;

along the first direction, the plurality of first touch electrode rows are located at a side of the plurality of second touch electrode rows away from the bonding area;

a number of touch signal lines connected to each touch electrode of the plurality of first touch electrode rows is greater than a number of touch signal lines connected to each touch electrode of the plurality of second touch electrode rows;

the plurality of first touch electrode rows includes at least an A-th touch electrode row adjacent to the plurality of second touch electrode rows;

the plurality of second touch electrode rows includes at least a B-th touch electrode row adjacent to the plurality of first touch electrode rows;

the plurality of second touch electrode rows further include at least a C-th touch electrode row adjacent to the B-th touch electrode row;

A, B, and C are adjacent positive integers;

an area of a touch electrode in the at least one B-th touch electrode row is smaller than an area of a touch electrode in the at least one A-th touch electrode row;

the area of the touch electrode in the at least one B-th touch electrode row is smaller than an area of a touch electrode in the at least one C-th touch electrode row; and the area of the touch electrode in the at least one C-th touch electrode row is smaller than the area of the touch electrode in the at least one A-th touch electrode row.

2. The touch display panel according to claim 1, wherein:
any first touch electrode row in the plurality of first touch electrode rows other than the at least one A-th touch electrode row is configured as a first sub-touch electrode row;

any second first touch electrode row in the plurality of second touch electrode rows other than the at least one B-th touch electrode row and the at least one C-th touch electrode row is configured as a second sub-touch electrode row; and areas of touch electrodes in the first sub-touch electrode row and the second sub-touch electrode row are all equal.

3. The touch display panel according to claim 1, wherein:
one A-th touch electrode row, one B-th touch electrode row and one C-th touch electrode row are adjacent in sequence along the first direction.

4. The touch display panel according to claim 1, wherein:
each touch electrode in each first touch electrode row of the plurality of first touch electrode rows is electrically connected to two touch signal lines; and each touch electrode in each second touch electrode row of the plurality of second touch electrode rows is electrically connected to one touch signal line.

5. The touch display panel according to claim 1, wherein:
the display area includes a plurality of pixels arranged as an array;

a number of the plurality of pixels arranged along the second direction form a pixel row;

a plurality of pixel rows are sequentially arranged along the first direction;

along a direction perpendicular to a light-exiting surface of the touch display panel, one touch electrode row overlaps the plurality of pixel rows.

6. The touch display panel according to claim 1, wherein:
the touch display panel further includes a common electrode; and the touch electrode is multiplexed as the common electrode.

7. The touch display panel according to claim 1, wherein:
the touch display panel further includes a plurality of scan lines extending along the second direction and a plurality of data lines extending along the first direction;

each pixel of the plurality of pixels includes a thin-film transistor and a pixel electrode;

a gate of the thin-film transistor is electrically connected to a scan line of the plurality of scan lines;

a source of the thin-film transistor is electrically connected to a data line of the plurality of data lines; and a drain of the thin-film transistor is electrically connected to the pixel electrode.

8. The touch display panel according to claim 1, wherein:
the plurality of touch electrodes and the plurality of touch signal lines are disposed on different film layers of the touch display panel; and a touch electrode of the plurality of touch electrodes and a touch signal line of the plurality of touch signal lines are electrically connected by at least one contact via.

9. The touch display panel according to claim 1, wherein:
the touch display panel is a self-capacitive touch display panel.

10. The touch display panel according to claim 1, wherein:
a material of the plurality of touch electrodes includes a semiconductor transparent conductive film made of indium tin oxide.

11. A touch display panel, comprising:
a display area; and
a non-display area surrounding the display area,
wherein:
the non-display area includes a bonding area;
along a first direction, the bonding area is located on a side of the non-display area adjacent to the display area;
the bonding area includes a plurality of signal input terminals;
the display area includes a plurality of touch electrodes arranged as an array;
each touch electrode of the plurality of touch electrodes is electrically connected to a corresponding signal input terminal of the plurality of signal input terminals through at least one touch signal line;
a number of the plurality of touch electrodes arranged along a second direction that intersects the first direction form a touch electrode row;
a plurality of touch electrode rows are sequentially arranged along the first direction;
the plurality of touch electrode rows include at least a plurality of first touch electrode rows and a plurality of second touch electrode rows;
along the first direction, the plurality of first touch electrode rows are located at a side of the plurality of second touch electrode rows away from the bonding area;
a number of touch signal lines connected to each touch electrode of the plurality of first touch electrode rows is greater than a number of touch signal lines connected to each touch electrode of the plurality of second touch electrode rows;
the plurality of first touch electrode rows includes at least an A-th touch electrode row adjacent to the plurality of second touch electrode rows;
the plurality of second touch electrode rows includes at least a B-th touch electrode row adjacent to the plurality of first touch electrode rows;

the plurality of second touch electrode rows further include at least a C-th touch electrode row adjacent to the B-th touch electrode row;

A, B, and C are adjacent positive integers;

an area of a touch electrode in the at least one B-th touch electrode row is smaller than an area of a touch electrode in the at least one A-th touch electrode row;

the area of the touch electrode in the at least one B-th touch electrode row is smaller than an area of a touch electrode in the at least one C-th touch electrode row;

any first touch electrode row in the plurality of first touch electrode rows other than the at least one A-th touch electrode row is configured as a first sub-touch electrode row;

any second first touch electrode row in the plurality of second touch electrode rows other than the at least one B-th touch electrode row and the at least one C-th touch electrode row is configured as a second sub-touch electrode row;

areas of touch electrodes in the first sub-touch electrode row and the second sub-touch electrode row are all equal;

each of the areas of the touch electrodes in the first sub-touch electrode row and the second sub-touch electrode row is m0;

the area of the touch electrode in the A-th touch electrode row is greater than m0; and the area of the touch electrode in the B-th touch electrode row is smaller than m0.

12. The touch display panel according to claim 11, wherein:

a number of rows of the A-th touch electrode row is more than one;

a number of rows of the C-th touch electrode row is more than one; and along the first direction, along a direction pointing from the first touch electrode row to the second touch electrode row, areas of touch electrodes of each touch electrode row in the more than one C-th touch electrode rows are gradually increased to m0, and along a direction pointing from the second touch electrode row to the first touch electrode row, areas of touch electrodes of each touch electrode row in the more than one A-th touch electrode rows are gradually decreased to m0.

13. The touch display panel according to claim 11, wherein:

the area of the touch electrode in the C-th touch electrode row is smaller than m0.

14. The touch display panel according to claim 11, wherein:

the area of the touch electrode in the A-th touch electrode row is m1, and m1=m0×a %, wherein a is a rational number;

the area of the touch electrode in the B-th touch electrode row is m2, and m2=m0×b %, wherein b is a rational number;

the area of the touch electrode in the C-th touch electrode row is m3, and m3=m0×c %, wherein c is a rational number; and a>100, b<100, 10≤a-b≤25, and c-b≤25.

15. The touch display panel according to claim 14, wherein:

a %=110%;

b %=90%; and c %=100%.

16. A touch display device, comprising:

a touch display panel, wherein the touch display panel includes:

a display area; and a non-display area surrounding the display area, wherein:

the non-display area includes a bonding area;

along a first direction, the bonding area is located on a side of the non-display area adjacent to the display area;

the bonding area includes a plurality of signal input terminals;

the display area includes a plurality of touch electrodes arranged as an array;

each touch electrode of the plurality of touch electrodes is electrically connected to a signal input terminal of the plurality of signal input terminals through at least one touch signal line;

a number of the plurality of touch electrodes arranged along a second direction that intersects the first direction form a touch electrode row;

a plurality of touch electrode rows are sequentially arranged along the first direction;

the plurality of touch electrode rows include at least a number of first touch electrode rows and a number of second touch electrode rows;

along the first direction, the plurality of first touch electrode rows are located at a side of the plurality of second touch electrode rows away from the bonding area;

a plurality of touch signal lines connected to each touch electrode of the plurality of first touch electrode rows is greater than a plurality of touch signal lines connected to each touch electrode of the plurality of second touch electrode rows;

the plurality of first touch electrode rows include at least one A-th touch electrode row adjacent to the second touch electrode row;

the plurality of second touch electrode rows include at least one B-th touch electrode row adjacent to the first touch electrode row;

the plurality of second touch electrode rows further include at least one C-th touch electrode row adjacent to the B-th touch electrode row;

A, B, and C are adjacent positive integers;

an area of a touch electrode in the at least one B-th touch electrode row is smaller than an area of a touch electrode in the at least one A-th touch electrode row;

the area of the touch electrode in the at least one B-th touch electrode row is smaller than an area of a touch electrode in the C-th touch electrode row; and the area of the touch electrode in the at least one C-th touch electrode row is smaller than the area of the touch electrode in the at least one A-th touch electrode row.

17. The touch display device according to claim 16, wherein:

any first touch electrode row in the plurality of first touch electrode rows other than the at least one A-th touch electrode row is configured as a first sub-touch electrode row;

any second first touch electrode row in the plurality of second touch electrode rows other than the at least one B-th touch electrode row and the at least one C-th touch electrode row is configured as a second sub-touch electrode row; and areas of touch electrodes in the first sub-touch electrode row and the second sub-touch electrode row are all equal.

18. The touch display device according to claim 17, wherein:
- each of the areas of the touch electrodes in the first sub-touch electrode row and the second sub-touch electrode row is m0;
- the area of the touch electrode in the A-th touch electrode row is greater than m0; and
- the area of the touch electrode in the B-th touch electrode row is smaller than m0.

19. The touch display device according to claim 18, wherein:
- the area of the touch electrode in the A-th touch electrode row is m1, and m1=m0×a %, wherein a is a rational number;
- the area of the touch electrode in the B-th touch electrode row is m2, and m2=m0×b %, wherein b is a rational number;
- the area of the touch electrode in the C-th touch electrode row is m3, and m3=m0×c %, wherein c is a rational number; and
- a>100, b<100, 10≤a-b≤25, and c-b≤25.

20. The touch display device according to claim 16, further comprising:
- a driving chip, including a plurality of output pins electrically connected to the plurality of signal input terminals in the bonding area.

\* \* \* \* \*